United States Patent [19]

Kinney, Jr. et al.

[11] Patent Number: 4,788,013
[45] Date of Patent: Nov. 29, 1988

[54] FOUR-WAY AIRFLOW INDUCED DRAFT CROSSFLOW COOLING TOWER

[75] Inventors: Ohler L. Kinney, Jr., Leawood; James R. Jones, Shawnee; Mark A. Kauffmann, Merriam; Paul W. Hink, Kansas City, all of Kans.

[73] Assignee: The Marley Cooling Tower Company, Mission, Kans.

[21] Appl. No.: 48,542

[22] Filed: May 11, 1987

[51] Int. Cl.$^4$ ................................................ B01F 3/04
[52] U.S. Cl. ..................... 261/24; 261/108; 261/DIG. 11; 261/112.2
[58] Field of Search .................. 261/DIG. 11, 108, 24, 261/112.2

[56] References Cited

U.S. PATENT DOCUMENTS

| | | | |
|---|---|---|---|
| 1,728,498 | 9/1929 | Mart | 261/DIG. 11 |
| 2,445,908 | 7/1948 | DeFlon et al. | 261/DIG. 11 |
| 2,540,091 | 2/1951 | Brackney | 261/112.2 |
| 2,636,371 | 4/1953 | Stephens | 261/DIG. 11 |
| 2,780,447 | 2/1957 | Kalthoff, Jr. | 261/DIG. 11 |
| 3,363,885 | 1/1968 | Meek | 261/30 |
| 3,739,556 | 6/1973 | Waters | 261/DIG. 11 |
| 4,052,491 | 10/1977 | Lefevre | 261/112.2 |
| 4,252,751 | 2/1981 | Shito | 261/DIG. 11 |
| 4,416,836 | 11/1983 | Sinek | 261/DIG. 11 |
| 4,422,983 | 12/1983 | Bardo, et al. | 261/DIG. 11 |
| 4,548,766 | 10/1985 | Kinney, Jr. et al. | 261/112.2 |
| 4,637,903 | 1/1987 | Bardo et al. | 261/DIG. 11 |
| 4,687,604 | 8/1987 | Goettl | 261/29 |

FOREIGN PATENT DOCUMENTS

| | | | |
|---|---|---|---|
| 263114 | 8/1927 | United Kingdom | 261/DIG. 11 |
| 571570 | 8/1945 | United Kingdom | 261/DIG. 11 |

OTHER PUBLICATIONS

Marley Class 500 Cross Flow Cooling Tower, Brochure CF-500-71, Received 10/78, Marley Co., Mission, Kansas.
Brochure Entitled Polacel Cooling Towers; CM Series Counterflow, Dallas TX. 75229.
Advertisement for Ceramic Cooling Tower Company, Fort Worth, Texas, 76101.
Advertisement for Perma-Pipe, 7720 N. Lehigh Ave., Niles, Ill. 60648.
Advertisement for Delta Cooling Towers, Fairfield, N.J. 07007.

*Primary Examiner*—Tim Miles
*Attorney, Agent, or Firm*—Hovey, Williams, Timmons & Collins

[57] ABSTRACT

A crossflow cooling tower has a number of fill structure sections which are arranged at equally spaced intervals around the entire perimeter of a central plenum that receives generally horizontal currents of air simultaneously from all of the fill structure sections and causes the air to be discharged in an upwardly direction out of the tower. In one embodiment, the tower is provided with four upright fill structure sections disposed in a square arrangement in horizontal view, and a number of the towers may be located adjacent each other in a side-by-side diamond-like arrangement so that each air inlet face of each tower readily communicates with the atmosphere. Both the hot water distribution basin and the cold water distribution basin are formed as integrally molded, one-piece components, and four upright air baffle corner supports carry the weight of adjacent fill structure sections as well as the load presented by the overhead hot water basin, thereby minimizing the need for additional supporting members, bracing or casings to provide necessary structural integrity.

16 Claims, 3 Drawing Sheets

FOUR-WAY AIRFLOW INDUCED DRAFT CROSSFLOW COOLING TOWER

BACKGROUND OF THE INVENTION

1. Field of the Invention

This invention relates to an induced draft, crossflow water cooling tower wherein a plurality of upright fill structure sections are disposed at generally equally spaced intervals around the entire tower with only a minimum of non-air inlet surface facing outwardly of the tower. The construction maximizes the area available for exposure of air inlet faces of the fill structure for a given plan area of the tower.

In order to enhance the corrosion resistance of the tower components, particularly in coastal areas where salt deposition is an ongoing problem, the hot water distribution basin, the cold water basin and the sections of the tower between fill structures are all advantageously manufactured of a corrosion resistant material such as a reinforced synthetic resin. The fill structure is provided with chevron pattern synthetic resin film fill sheets which also are resistant to corrosion or degradation in high corrosion risk areas. Similarly, the fan components of the tower are desirably constructed of materials which resist corrosion such as aluminum, stainless steel, reinforced synthetic resin, or the like.

In one preferred form of construction, the tower has four fill structure sections presenting a square arrangement in plan view having upright, triangular shaped corner column supports between adjacent fill structure sections. The underlying cold water basin is connected to the corner columns and the upper hot water distribution basin is connected to and supported by the columns.

The invention is particularly useful for small and medium sized towers employed in commercial buildings and limited scale industrial applications.

2. Description of the Prior Art

In general, mechanical draft crossflow water cooling towers may have a hot water distribution basin, a cold water collection basin, and fill structure disposed between the distribution basin and the collection basin. Hot water delivered to the overhead basin is permitted to gravitate through distribution means forming a part of the hot water basin onto underlying fill structure. Gravitational flow of the water downwardly through the fill structure is crossflow relationship to horizontal currents of air flowing transversely through the fill structure from the inlet to the outlet thereof, is cooled as it moves downwardly through respective fill sections. The internal, upright outlet face or faces of the fill structure are in communication with a fan cylinder located in the upper part of the tower or in a vertical wall of the casing spaced from the outlet face of the fill. A motor driven fan within the fan cylinder causes air to be drawn in through the inlet faces of the fill structure, to move horizontally through the fill, and then to be discharged from the tower through the fan cylinder.

Crossflow water cooling towers have been manufactured and sold in various forms for a number of years. One crossflow tower used for air conditioning applications in small commercial establishments and larger multifamily residential units has a rectangular casing with a cool air inlet face in one upright sidewall, and a hot air discharge aperture in the upper horizontal surface. A fill pack primarily made up of film sheet fill struture is used to bring hot water discharged from the upper hot water basin into crossflow water cooling relationship to air drawn into the fill through the air inlet and ultimately discharged via the hot water discharge aperture. This type of cooling tower has for the most part been sold as a completed package which is transported to the use site.

Another crossflow cooling tower in widespread usage is similar to the package tower just described except that it is much larger, has a larger capacity, is field erected, and is employed in industrial and process applications, as well as large scale buildings requiring significant water cooling capacity for air conditioning.

Field erected crossflow cooling towers may either be of the so-called single airflow or double airflow type. In the single airflow configuration, cooling air enters a single cool air inlet face, passes horizontally through the fill structure in transverse relationship to the hot water gravitating therethrough, and is ultimately vertically discharged through the hot air discharge opening. The three remaining sides of the tower casing are closed.

A double airflow tower has cool air inlet faces on opposed sides of the rectangular casing, is provided with two separate fill structures adjacent a respective air inlet face, and has a single centrally located air discharge fan and cylinder between the hot water distribution basins of the tower for simultaneously pulling air in through both air inlets and to then discharge such air inwardly from the central internal air plenum defined by the inner, spaced upright faces of respective fill structures. In the double airflow type of tower, the distance between opposed air inlet faces of the tower casing is typically significantly greater than the horizontal dimension of the tower between opposed closed sidewalls.

Increasing energy costs for operating the fans of water cooling towers and to pump water to be cooled to hot water distribution basins has required that the overall economics of cooling towers be carefully scrutinized. Initial installation costs are important as well as operating expenses and the overall theoretical longevity of the tower. Finally, especially in the case of smaller cooling towers for light industry, commercial and multi-unit residential installations, aesthetics must be taken into account in the design of the cooling tower.

Until the present invention, there has not been available a water cooling tower at a reasonable cost which is fabricated of highly corrosion resistant materials, has a long useful life even in geographical areas where corrosion from salt is a problem, presents a compact package for use in smaller capacity cooling tower applications, is aesthetically pleasing, operates with equal effectiveness regardless of the direction of ambient air currents, and may be installed at different sites, either as a single tower or as a series of towers without substantial regard for the disposition of adjacent structures or the direction of prevailing air currents.

Furthermore, it has not heretofore been possible to provide a water cooling tower having the attributes described which is compact in design yet provides the water cooling capacity of much larger previously availabe crossflow water cooling towers by virtue of the fact that fill structures are provided on all four sides of the tower for most effective cooling regardless of prevailing air currents and permitting utilization of fill structures of minimum dimensions in the direction of airflow for maximum water cooling effectiveness.

SUMMARY OF THE INVENTION

In order to accomplish maximum cooling of water in a minimum of plan area while at the same time having desirable corrosion resistant properties, the crossflow cooling tower of the present invention is provided with a number of fill structure sections which are arranged at generally equally spaced intervals around the entire perimeter of a central air discharge plenum so that equal opportunitites for air to enter the fill structure of the tower are presented around substantially the entire tower perimeter. In this manner, the volume of fill structure for a given size of tower is beneficially increased, side casings are substantially eliminated, and water cooling effectiveness is not dependent upon the direction of prevailing winds.

In addition, the various paths of travel encountered by air entering different regions of the air inlet face of each of the fill structures are uniform in length so that all areas of the fill structures receive substantially equal quantities of crossflowing air and the overall cooling effectiveness of the tower is thereby enhanced.

In a preferred embodiment of the invention, the tower has four upright fill structure sections which are disposed in a square arrangement in horizontal plan around four sides of a central, square plenum. Four upright, triangular corner support and air baffle members or columns of reinforced synthetic resin material are configured and arranged to carry the overlying hot water distribution basin. Additionally, horizontal tubes extending between adjacent pairs of corner supports or columns function as mounting structure for associated fill structure sections which are comprised of a plurality of shaped synthetic resin film fill sheets. Best results are obtained when the fill sheets have a chevron pattern for maximum contact of gravitating water with air flowing transversely therepast. Both the upper, hot water distribution basin and the lower, cold water collection basin are of unitary, one-piece construction formed from glass reinforced synthetic resin materials as for example, polyester which is less costly and more resistant to corrosion than coparable components fabricated from metallic materials or wood.

In the preferred embodiment having four sections of fill structure, air enters the tower simultaneously along four essentially horizontal directions of travel to pass through respective sections of the fill structure. The centrally located fan in the upper part of the tower causes air streams to be drawn through each of the fill structures and to then merge and be discharged vertically from the top of the tower. The triangular-shaped corner air baffle supports are constructed so that upright edge portions of the air discharge faces at adjacent fill structure sections are located in close proximity to each other thereby minimizing the overall plan area of the tower. The outer portions of each of the air baffle supports terminate adjacent the outermost margins of corresponding fill sections to preclude inflow of air between adjacent sections of the fill. The overlying hot water distribution basin is carried solely by the four air baffle corner supports, thereby substantially eliminating significant obstructions to air travel within the plenum of the tower.

The tower design is such that a plurality of individual towers may be arranged in a side-by-side relationship with opposite upright triangular support columns abutting a support column of a respective, adjacent tower. This multiple tower arrangement contributes to the overall aesthetic effect of the distributed towers, yet all four air inlet faces of each tower are fully exposed to the atmosphere so that the airflow through each fill structure section is not adversely affected by the presence of adjacent towers.

The cold water collection basin comprises a unitary, integrally molded component of synthetic resinous materials which has a central, circular raised portion and a depressed collection trough extending around the base of the central portion. The raised nature of the central portion directs cold water to the trough and reduces the volume of cold water in the collection basin at any particular time so that the amount of water necessary to ensure satisfactory performance of the entire cooling system is decreased.

DETAILED DESCRIPTION OF THE DRAWINGS

An induced draft, crossflow cooling tower 10 is shown in FIGS. 1–4 and takes the form of a particularly preferred embodiment thereof wherein four-way horizontal airflow is drawn into the tower 10 by means of a centrally located fan assembly 12. The tower 10 includes a hot water distribution flume means or basin 14 for receiving incoming hot water to be cooled, and also includes a cold water collection means or basin 16 disposed beneath the hot water distribution basin 14.

Figure 1:
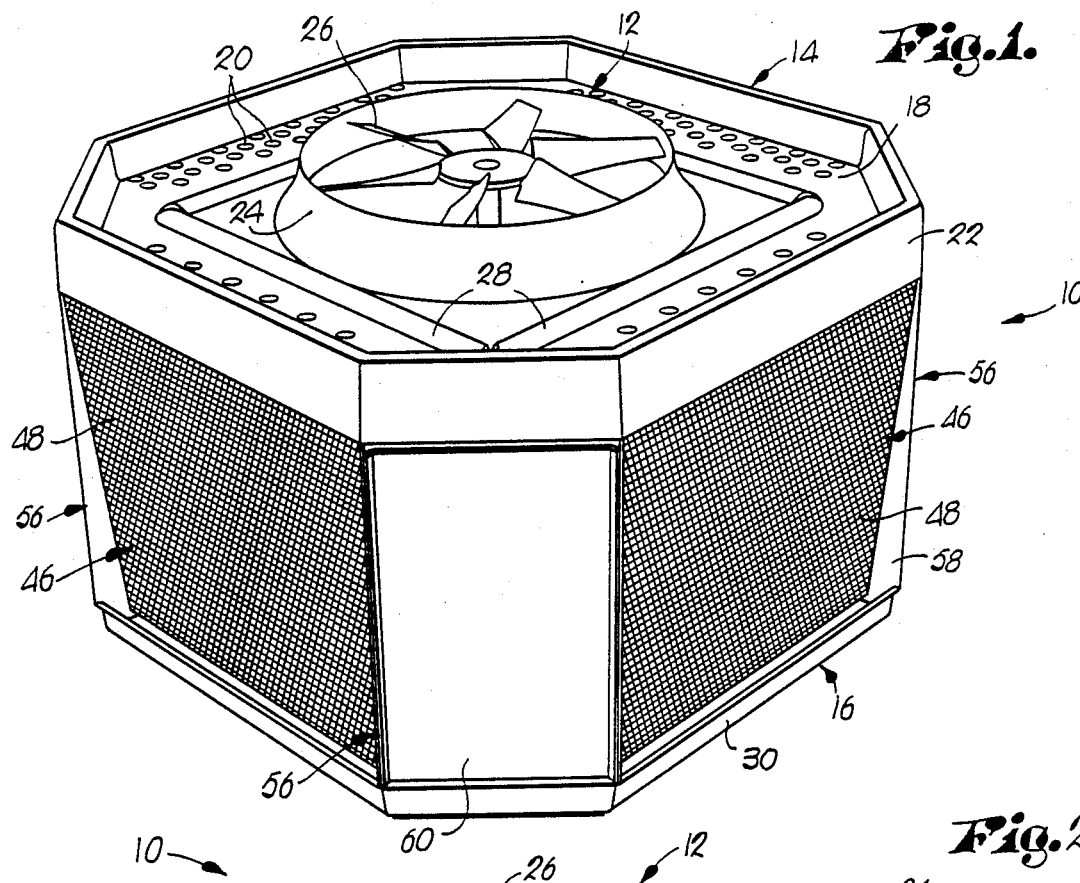
FIG. 1 is a side perspective view of the crossflow cooling tower of the present invention in accordance with a preferred embodiment thereof, wherein is illustrated two of four banks or sections of fill structure which are arranged at equally spaced locations around the perimeter of a central. square plenum.
Figure 2:
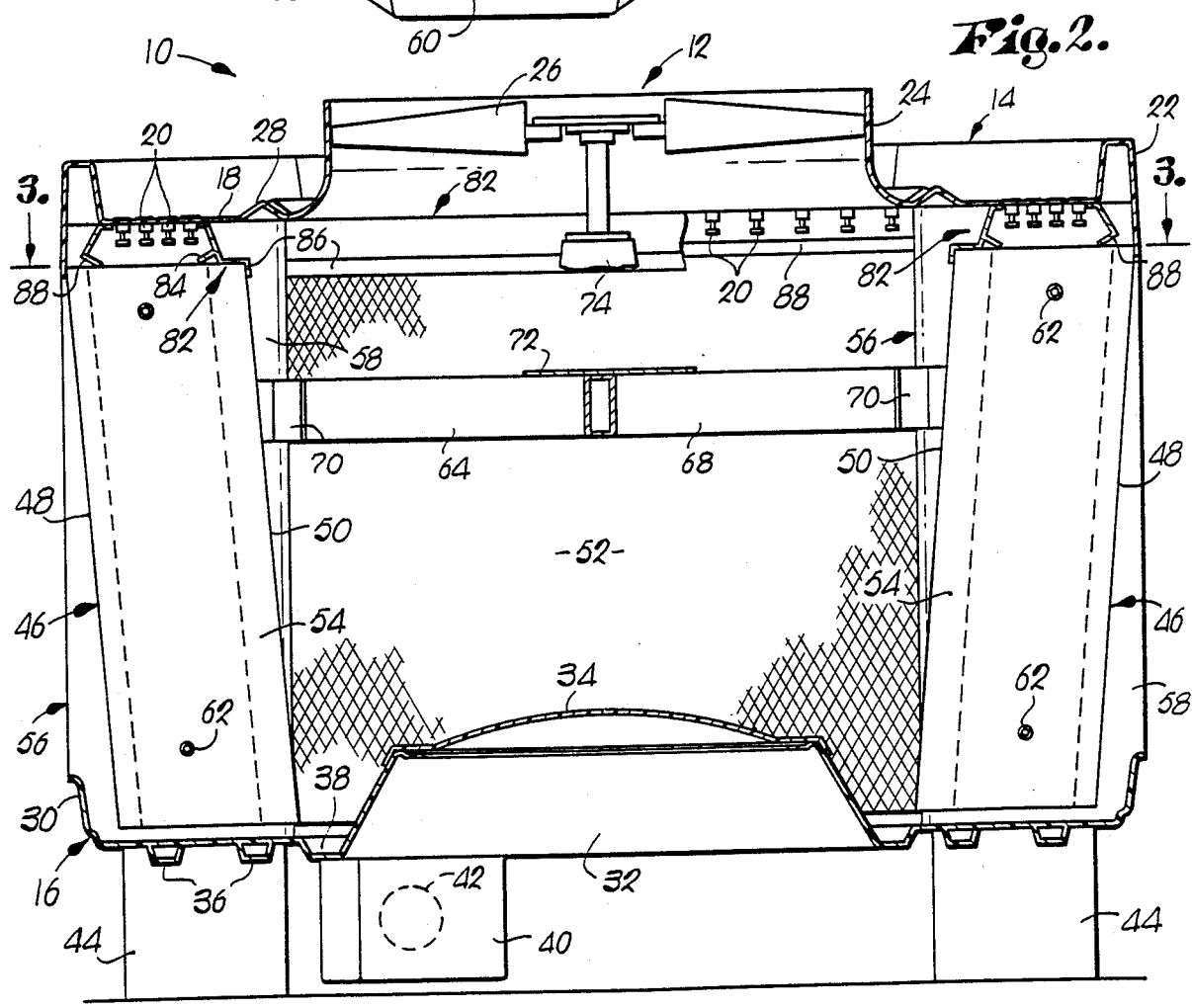
FIG. 2 is an enlarged, side cross sectional view of the tower shown in FIG. 1 and depicts an overhead hot water distribution basin, three of the fill structure sections, a cold water collection basin below the fill structure having a raised central portion, and a fan located within an integrally molded fan cylinder of the hot water distribution basin.
Figure 4:
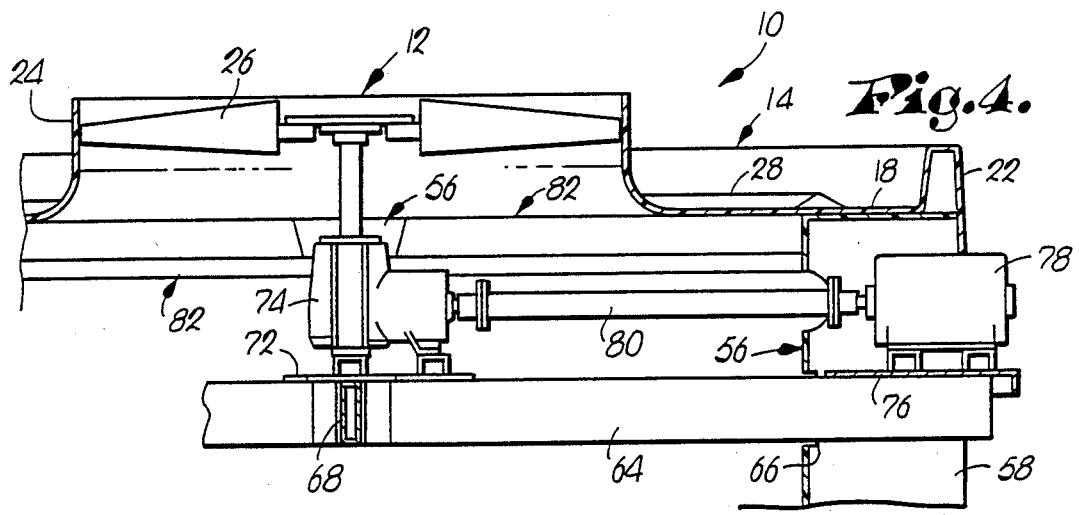
FIG. 4 is a fragmentary, enlarged, side sectional view taken along line 4—4 of FIG. 3 to reveal a motor and right angle gear box associated with the fan.

As illustrated in FIGS. 1, 2 and 4, the hot water distribution basin 14 advantageously comprises an integrally molded, one-piece member formed from glass reinforced polyester materials shaped to present a horizontally extending floor 18 which carries a plurality of water dispersing distribution nozzles 20. Basin 14 has an inverted, generally U-shaped outer wall 22 which rises above the floor 18 and extends completely around the periphery of tower 10 and presents an orifice bounded by a fan cylinder region 24 that includes a lower tapered portion and an upper cylindrical portion which is generally adjacent the tips of fan blades 26 of fan assembly 12. Four upstanding, horizontally elongated ribs 28 are molded in the hot water distribution basin 14 for reinforcement of the latter, and adjacent ends of the ribs 28 are slightly spaced from each other as depicted in FIG. 1.

Figure 5:
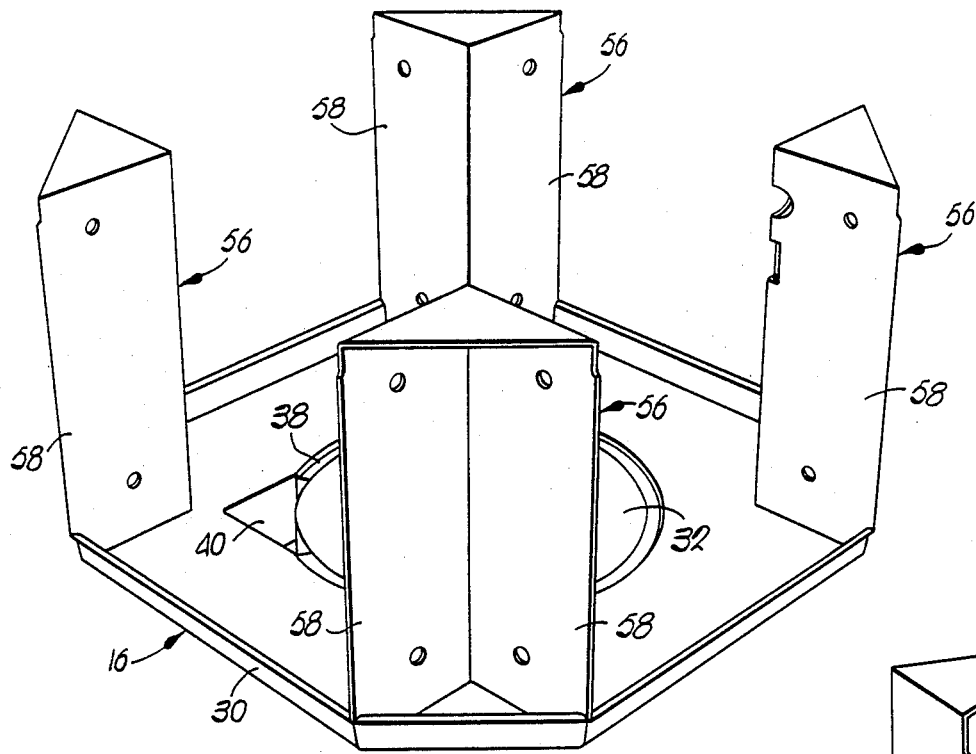
FIG. 5 is a perspective view of a partially assembled tower similar to the tower in FIG. 1, particularly illustrating the relationship between the cold water collection basin and the four upright corner supports before installation of the overlying hot water distribution basin, the fill structure sections and the fan assembly.

The cold water collection basin 16, as can be readily appreciated by reference to FIG. 5, also comprises an integrally molded, one-piece member preferably constructed from glass reinforced polyester materials. Basin 16 includes an upstanding perimeter wall 30 and an upwardly extending, frustoconical central portion 32 that is covered by a domed cap 34. The outer wall 22 of the hot water distribution basin 14 and the upstanding wall 30 of the cold water collection basin 16 have substantially the same peripheral configuration which is essentially square but with diagonal or truncated corner regions. Viewing FIG. 2, two side-by-side reinforcing ribs 36 extend along the length of the cold water collection basin 16 beneath each of the longer four sides of the same.

Viewing FIGS. 2 and 5, it can be seen that the cold water collection basin 16 is provided with a circumferentially extending depressed area presenting a trough 38 which directly communicates with a dropped corner sump 40 leading to a cold water outlet 42 identified by the dashed lines in FIG. 2. If desired, foundation means 44 may be provided beneath the tower 10 in supporting relationship to the perimeter sections thereof.

The fill assembly for the tower 10 may comprise for example, four upright fill structure sections 46 interposed between the hot water distribution basin 14 and the cold water collection basin 16. Hot water delivered from basin 14 is directed onto respective fill structure sections 46 for gravitational passage to the cold water collection basin 16 therebelow. Each of the fill structure sections 46 present an upright air inlet face 48 (FIGS. 1 and 2) for admitting generally horizontal currents of air to a respective section of the fill structure in transverse flow relationship to hot water gravitating therethrough. Each of the fill structure sections 46 further presents an upright air outlet face 50 for discharging air passing through the respective section 46.

Figure 3:
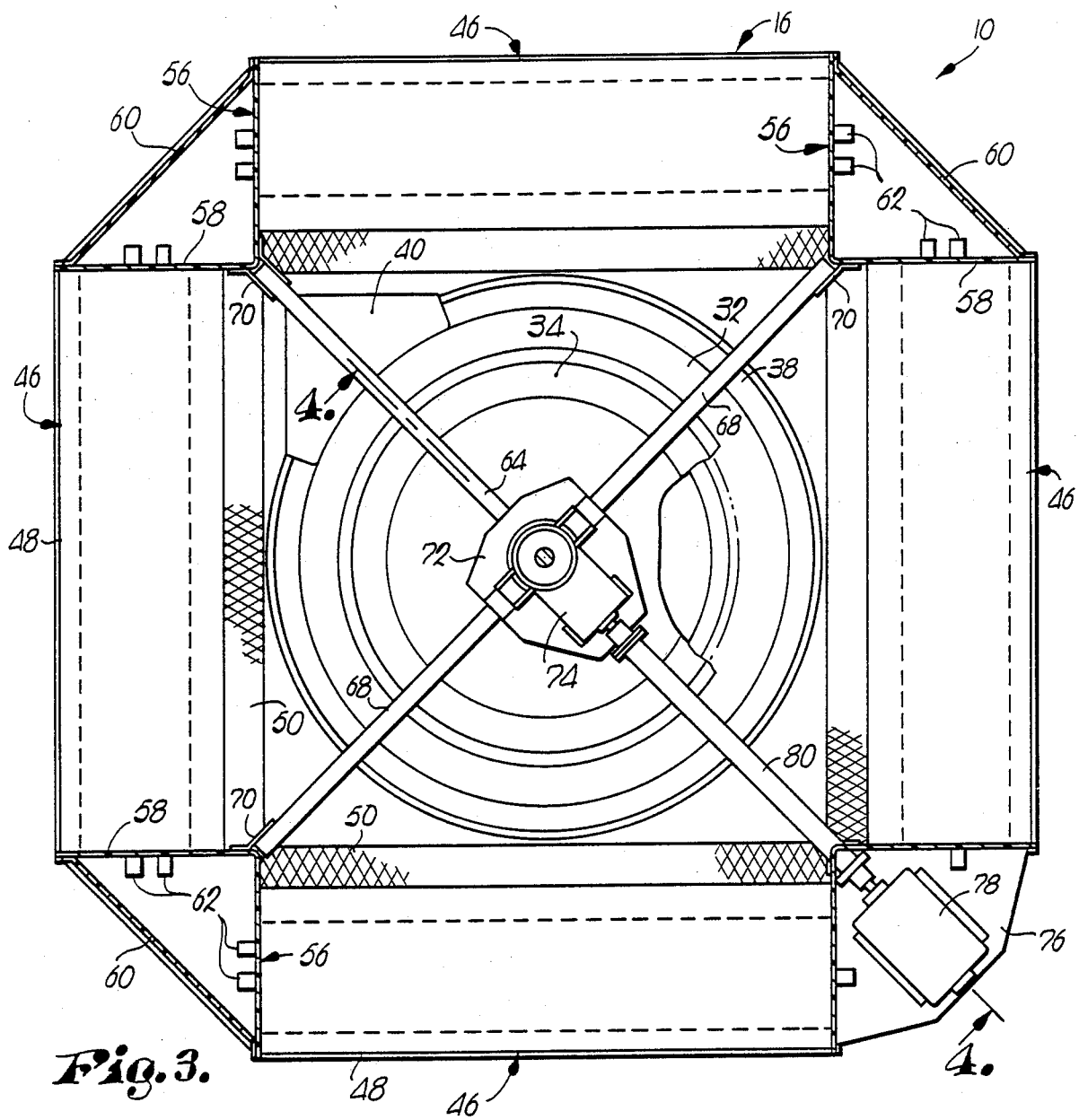
FIG. 3 is an enlarged, horizontal sectional view taken along line 3—3 of FIG. 2 to show the essentially square arrangement of the four fill structure sections along with four upright corner supports having L-shaped walls which contact ends of adjacent fill structure sections.

Viewing FIGS. 1-3, the fill structure sections 46 are disposed in a square arrangement in horizontal sectional view with the first two of the sections 46 being opposed and spaced from each other and the remaining two sections 46 being located transversely between the first two sections 46 in spaced, opposed relationship to each other. As a consequence, the air outlet face 50 of each fill structure section 46 is transversely oriented relative to the air outlet face 50 of each adjacent fill structure section 46.

The four outlet faces 50 face inwardly of the tower 10 and present a common, horizontally square plenum that is centrally disposed between the four fill structure sections 46 for receiving generally horizontal currents of air simultaneously from all four of the fill structure sections 46 and enabling discharge of the air in an upwardly direction out of the tower 10. Each bank or section 46 of the fill structure is inclined inwardly as lower regions of the tower 10 are approached in order to ensure that water gravitating through the sections 46 remains within the same and is not drawn in excessive amounts into the plenum 52 through the influence of the horizontal, inwardly directed currents of air.

Each of the fill structure sections 46 preferably comprises a plurality of film fill sheets 54 of the type, for instance, shown in U.S. Pat. No. 4,548,766, dated Oct. 22, 1985, and assigned to the assignee of the present invention. Each of the sheets 54, as illustrated schematically by the dashed lines in FIG. 2, is formed to present an inlet region adjacent the air inlet face 48, a central region which includes a repeating pattern of chevron defining ridges, and an outlet region which includes wall surface adjacent the air outlet face 50 that functions as a drift eliminator. A series of integral spacers projecting in opposite directions from each of the sheets 54 complementally receives outer portions of each spacer of adjacent sheets 54 to maintain a correct horizontal spacing between adjacent sheets 54. By utilizing film sheets of the type illustrated and described in the U.S. Pat. No. 4,548,766, film sheets may be employed presenting a horizontal air path of no more than about 21 inches. A short air travel path significantly reduces the overall plan area of the tower and decreases tower cost without sacrificing overall cooling capacity.

Figure 6:
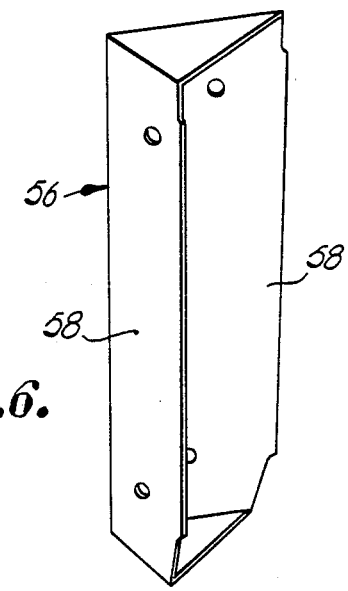
FIG. 6 is an enlarged perspective view of one of the corner supports which are shown in FIG. 5.

Use of short air travel film fill sheets also has the desirable attribute of limiting the size requirements of the four corner support and air baffle columns 56 which extend from the cold water collection basin 16 inwardly of wall 30 to the hot water distribution basin 14 to support the latter as well as each of the fill structure sections 46. Referring to FIG. 6, it can be seen that each of the upright air baffles and supports 56 has L-shaped walls 58 oriented to contact the endmost sheet 54 of the adjacent, respective fill structure section 46. In addition, as shown for example in FIGS. 1 and 3, a diagonally extending plate 60 is provided for the supports 56 to complete the triangular structure and present an aesthetically pleasing appearance. Minimization of the transverse dimensions of the corner columns not only decreases the material requirements for the tower but also makes it unnecessary to incorporate added structure solely for the purpose of providing air seals or filler casing at the corners. Furthermore, the triangular shape of each column 56 permits utilization of supports which have maximum inherent strength for their size.

It can also be observed from FIG. 3, that the L-shaped walls 58 of each air baffle column 56 define two converging inwardly directed interior wall members which have a horizontal dimension in the direction of airflow through respective fill sections, which is substantially equal to the length of the air path. Furthermore, the legs of each of the L-shaped walls 58 lie in essentially flat, closely adjacent relationship to the side margin of a respective proximal fill section 46 such that the columns 56 serve as air baffles to preclude airflow of ambient air into the tower plenum 52 in bypassing relationship to the fill sections. Thus, the corner air baffle columns 56 serve the function of supporting the fill sections therebetween, the overlying hot water distribution basin 14, and the fan assembly 12.

Two elongated members or tubes 62 extend between each leg of the L-shaped wall 58 of support 56 to the opposed wall 58 of the adjacent support 56 in parallel relationship to the longer, four outer sides of the tower 10. The tubes 62 extend through apertures formed in each of the film fill sheets 54 in order to support the weight of the fill structure sections 46 and carry the same in the desired, inclined orientation.

Within the plenum 52, a beam 64 extends diagonally across the tower 10 from the inside corner of one of the upright supports 56 and through an opening 66 (see FIG. 4) formed in the opposed support 56. Two shorter, cross beams 68 are connected to beam 64 near the center of tower 10 and extend away from each other toward the inside corners of the remaining two supports 56. Brackets 70 (FIGS. 2–3) are provided for securely coupling the ends of beams 64, 68 to the associated supports 56.

A plate 72 rests on beams 64, 68 over the juncture of the latter for supporting a right angle gear box 74 of the fan assembly 12. In addition, a plate 76 carried by beam 64 between the L-shaped walls 58 of one of the supports 56 is provided for supporting a motor 78 interconnected to gear box 74 by shaft 80.

Finally, as illustrated best in FIGS. 2 and 4, a member 82 optionally formed from sheet metal is connected to the underside of the floor 18 of hot water distribution basin 14 and presents a flange 84 for deflecting a portion of the water dispersed by nozzles 20 toward the central region of the associated fill structure sheets 54 therebelow. The member 82 also has an innermost flange 86 that extends around the upper, inner corner of the respective fill structure section 46. A second member 88, outboard of each of the four inner members 82, is provided for ensuring that water discharged by nozzles 20 in a direction outwardly of the tower 10 is instead redirected toward the central region of the underlying fill structure sections 46.

In use of the tower 10, incoming hot water from a supply pipe is discharged over the floor 18 of distribution basin 14 in a location which may be optionally disposed inboard of the ribs 28 next to one of the truncated corners of basin 14. If desired, a splash box may be provided for reducing the magnitude of turbulence of the hot water before discharge onto the floor 18, and the supply piping may be located externally of the tower 10.

The tower 10 is supported in a horizontal orientation so that the floor 18 of hot water distribution basin 14 extends in a horizontal plane and all of the distribution nozzles 20 encounter an equal head of hot water which is confined by the outer, upstanding wall 22 as well as the central, upwardly extending fan cylinder region 24. The distribution nozzles 20 disperse hot water to underlying regions of the upper face of associated fill structure sections 46.

The water then descends through the fill structure sections 46 under the influence of gravity toward the collection basin 16. The fan blades 26, powered by motor 78, rotate to draw air simultaneously through all four of the fill structure sections 46 and into the central plenum 52. Air flowing horizontally through each of the fill structure sections 46 encounters and thermally interacts with the hot water descending through the sections 46 to cool the water before the same is discharged through a bottom face of the respective section 46.

Referring to FIG. 2, the cooled water exiting the sections 46 enters the cold water collection basin 16 and flows to the circular trough 38 and into sump 40 for discharge through the outlet conduit 42. During normal operation of the tower 10, sufficient water is present at all times in the collection basin 16 to rise above the lower end of each film fill sheet 54 which is slightly spaced from the collection basin 16, in order to prevent air drawn into the plenum 52 from bypassing the fill structure sections 46 along a path below the same.

Air which exits the air outlet face 50 of each of the fill strcture sections 46 enters the plenum 52 and is drawn upwardly by the induced draft caused by fan blades 26 for vertical discharge out of tower 10. As such, the air travels into the fill structure sections 46 simultaneously along four different directions, and comingles somewhat within plenum 52 while turning upwardly for vertical discharge through the fan cylinder region 24 of basin 14.

As can be appreciated by reference to FIG. 3, the vertical sides of each outlet face 50 of the fill structure sections 46 are directly adjacent the sides of the air outlet face 50 of the adjacent fill structure sections 46 so that substantially the entire periphery of the plenum 52 is defined by the air outlet faces 50 and only a small portion of the four upright supports 56 is exposed to plenum 52. Components such as end casings or other types of structural members are eliminated and the fill structure sections 46 define as much as practicable the boundary of plenum 52 to thereby shorten the average path of travel of air flowing through all regions of the sections 46 for a given quantity of fill structure. As a consequence, horsepower requirements of fan assembly 12 are reduced and variation in airflow rates between, for instance, the center of a particular fill structure section 46 and an outer region of the same is minimized so that thermal interaction between the descending water and the horizontal currents of air is substantially uniform across the entire width of the section 46.

Moreover, the provision of the one-piece, integrally molded distribution basin 14 and the collection basin 16 greatly facilitates assembly and provides structural strength for the tower 10 in a simplified yet efficient fashion. Advantageously, the plenum 52 is devoid of obstructing structural members or other components except for beams 64, 68 and plate 72 in order to further increase the efficiency of the fan assembly 12.

Figure 7:
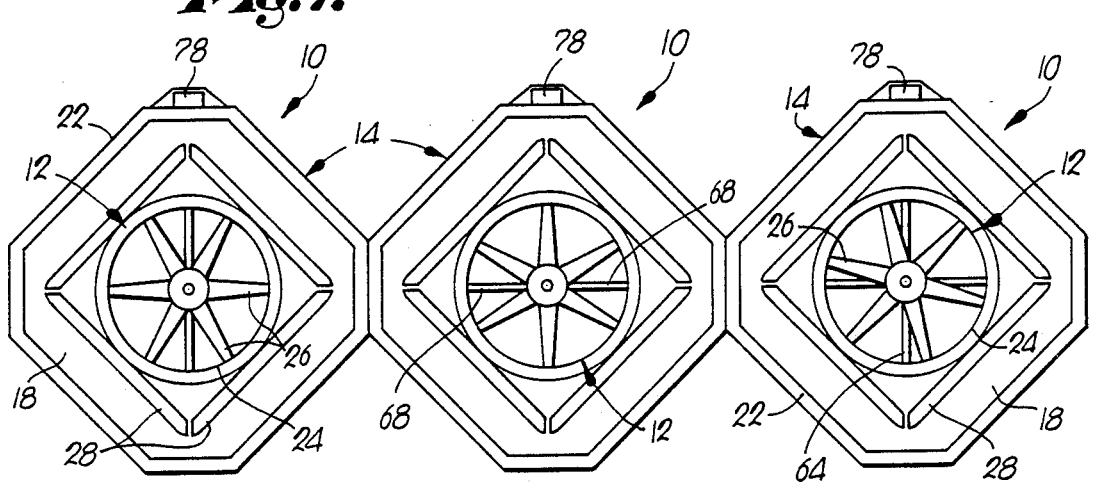
FIG. 7 depicts another embodiment of the invention wherein three towers each having four sections of fill structure are arranged along a line so that corner supports of adjacent towers are in abutting relationship to each other.

Referring now to FIG. 7, a number of the towers 10 can be arranged in an adjacent, side-by-side, diamond-like relationship in modular fasion such that one of the upright supports 56 for each tower 10 directly abuts an upright support 56 of an adjacent tower 10. In this manner, all four air inlet faces 48 of each tower 10 are fully exposed to the atmosphere to ensure equal opportunity for air entering all of the fill structure sections 46 of each tower 10. Furthermore, the arrangement depicted in FIG. 7 is particularly aesthetically pleasing and lends itself to use in shopping centers where a number of commonly located, relatively small cooling towers units may be specified.

Other embodiments of the invention, comprising three or more sections of fill structure, can also be devised. In each instance, however, the air outlet faces of the fill structure sections are arranged at generally equally spaced intervals around the entire perimeter of a common plenum to increase the total horizontal extent of fill structure for any given tower size and plan area while, at the same time, facilitating the flow of air through all sections of the tower.

Assembly of the tower 10 can be readily accomplished due in part to the minimization of structural components and the elimination of end casings and the like, and also due to the fact that both of the basins 14, 16 are of one-piece construction extending over the entire horizonal area of tower 10. Initially, the cold water collection basin 16 is mounted on foundation means 44, and the four upright air baffle columns 56 are secured to basin 16 by means of clips or other types of connection devices.

Next, the hot water distribution basin 14 is placed over the four supports 56 as shown in FIG. 2 such that the ends of members 82, 88 are directly adjacent upper regions of the L-shaped walls 58. Brackets 70 for the cross beams 68 are affixed to inside corners of two opposed supports 56 at an appropriate elevation.

Subsequently, sump 40 is installed in a hole in the cold water collectoin basin 16, and the domed cap 34 is placed over the central portion 32. The beam 64 is then installed by means of another bracket 70 to a corner of one of the supports 56, and plates 72, 76 are installed as indicated in FIG. 3. Gear box 74, motor 78, shaft 80 and fan blades 26 are then assembled and connected to the tower 10 above plates 72, 76.

Next, the film fill sheets 54 of each fill structure section 46 are installed by temporarily shifting tubes 62, 62 to one side of one of the associated supports 56 in order to leave a gap between the tubes 62, 62 and the other, associated support 56. Each of the sheets 54 is placed over the tubes 62 until the desired number of sheets 54 is reached, whereupon the tubes 62 are shifted longitudinally until protruding generally equally through both walls 58 of the associated supports 56, as is shown in FIG. 3. Finally, the plates 60 are placed over the supports 56 as indicated in FIG. 1, although a somewhat shortened plate 60 may be provided for the support 56 that carries motor 78 in order to provide clearance and expose the latter for servicing as may be desired.

It is to be realized, of course, that various additions or modifications may be effected to the particularly preferred embodiment of the invention which is shown for exemplary purposes in FIGS. 1-7. Accordingly, the invention should be deemed to be limited only by the fair scope of the claims which follow and by their mechanical equivalents thereof.

We claim:

1. An induced draft, crossflow cooling tower comprising:
    hot water distribution means presenting a horizontal flume for receiving incoming hot water to be cooled and having an outer, upstanding structural water retaining peripheral wall and a floor provided with a central, hot air discharge orifice;
    common cold water collection basin means disposed beneath said distribution means;
    four spaced upright fill structure sections interposed between said distribution means and said collection basin means for receiving hot water from said distribution means and for enabling gravitational passage of said water to said collection basin means therebelow,
    each of said fill structure sections presenting an upright air inlet face for admitting generally horizontal currents of air to a respective section of said fill structure in transverse flow relationship to said hot water gravitating therethrough,
    each of said fill structure sections presenting an upright air outlet face for discharging air passing through the respective section,
    said fill structure sections being disposed in a rectangular arrangement in horizontal sectional view with a first two of said sections being opposed and spaced from each other and the remaining two sections being located transversely between said first two sections in spaced, opposed relationship to each other,
    said air outlet face of each of said fill structure sections being transversely oriented relative to the air outlet face of each adjacent fill structure section,
    said air outlet faces facing inwardly of said tower and presenting a common, generally rectilinear plenum centrally disposed between said four fill structure sections for receiving generally horizontal currents of air simultaneously from all four of said fill structure sections and communicating with said orifice in the hot water distribution means;
    fan means operable to pull cool air in through the fill structure sections and communicating with said plenum to discharge hot air in an upward direction out of said tower through said orifice in the floor of the hot water distribution means; and
    transversely L-shaped air baffle corner structural supports carried by and extending upwardly from said cold water collection basin means to said hot water distribution means for supporting said hot water distribution means over said fill structure sections, each of said corner supports having a pair of upright, inwardly converging, angle-defining walls serving to carry respective fill structure sections between adjacent pairs of said air baffle supports, and located to substantially block inflow of ambient air between adjacent fill sections, and means joined to each pair of angle-defining walls preventing relative movement therebetween,
    said air baffle corner supports, the hot water distribution means and the cold water collection basin means being constructed of corrosion resistant synthetic resin material.

2. The invention as set forth in claim 1, wherein said material is a glass reinforced synthetic resin material.

3. The invention as set forth in claim 1, wherein said fan means is constructed of corrosion resistant material.

4. The invention as set forth in claim 1, wherein said cold water collection basin means comprises a basin extending beneath each of said fill structure sections and having an upwardly turned wall extending across a bottom front region of each fill structure section.

5. The invention as set forth in claim 1, wherein said baffle supports comprise four upright, outboard air baffle corner supports extending from said cold water collection basin means to said hot water distribution means.

6. The invention as set forth in claim 5, wherein said corner supports present L-shaped walls in plan section of an extent to contact end portions of respective adjacent fill structure sections and substantially block inflow of said cool air to the plenum in bypassing relationship to the fill structure sections.

7. The invention as set forth in claim 1, wherein said walls defining said orifice include an upright cylindrical portion for use as a fan cylinder.

8. The invention as set forth in claim 7; including an elongated member extending between each adjacent pair of said corner supports for carrying the respective fill structure section therebetween.

9. The invention as set forth in claim 8, wherein said fill structure sections comprise a plurality of film fill sheets.

10. The invention as set forth in claim 9; including a tube extending between each adjacent pair of said corner supports at a location spaced from said member in order to align said film fill sheets and substantially prevent lateral movement of the same.

11. An induced draft, crossflow cooling tower comprising:
   hot water distribution means presenting a horizontal flume for receiving incoming hot water to be cooled and having an outer, upstanding structural water retaining peripheral wall and a floor provided with a central, hot air discharge orifice;
   common cold water collection basin means disposed beneath said distribution means;
   at least three spaced upright fill structure sections interposed between said distribution means and said collection basin means for receiving hot water from said distribution means and for enabling gravitational passage of said water to said collection basin means therebelow,
   each of said fill structure sections presenting an upright air inlet face for admitting generally horizontal currents of air to a respective section of said fill structure in transverse flow relationship to said hot water gravitating therethrough,
   each of said fill structure sections presenting an upright air outlet face for discharging air passing through the respective section,
   each of said air outlet faces facing inwardly of said tower and presenting a common plenum between said at least three fill structure sections for receiving generally horizontal currents of air simultaneously from all of said fill structure sections and communicating with said orifice in the hot water distribution means;
   each of said air outlet faces being opposed, vertically extending side regions,
   said fill structure sections being arranged at intervals around the perimeter of said plenum with each of said side regions of said air outlet faces being adjacent a side region of an adjacent air outlet face thereby defining the extenet of said plenum and facilitate discharge of said air in an upwardly direction out of said tower;
   fan means operable to pull cool air in through the fill structure sections and communicating with said plenum to discharge hot air in an upward direction out of said tower through said orifice in the floor of the hot water distribution means; and
   transversely L-shaped air baffle corner structural supports carried by and extending upwardly from said cold water collection basin means to said hot water distribution means for supporting said hot water distribution means over said fill structure sections, each of said corner supports having a pair of upright, inwardly converging, angle-defining walls serving to carry respective fill structure sections between adjacent pairs of said air baffle supports, and located to substantially block inflow of ambient air between adjacent fill sections, and means joined to each pair of angle-defining walls preventing relative movement therebetween,
   said air baffle corner supports, the hot water distribution means and the cold water collection basin means being constructed of corrosion resistant synthetic resin material.

12. The invention as set forth in claim 11, wherein said material is a glass reinforced synthetic resin material.

13. The invention as set forth in claim 11, wherein said fan means is constructed of corrosion resistant material.

14. The invention as set forth in claim 11, wherein is provided walls defining said orifice and which include an upright cylindrical portion for use as a fan cylinder.

15. The invention as set forth in claim 14, wherein said fill structure sections comprise a plurality of film fill sheets supported by said upright corner supports.

16. A cooling tower system comprising: a plurality of cooling towers each having hot water distribution means, cold water collection basin means and at least three upright fill structure sections interposed between the respective hot water distribution means and said cold water collection basin means,
   each of said fill structure sections presenting an upright air inlet face for admitting generally horizontal currents of air to a respective section of said fill structure in transverse flow relationship to said hot water gravitating therethrough,
   each of said fill structure sections presenting an upright air outlet face for discharging air passing through the respective section,
   each of said air outlet faces facing inwardly of the respective tower and presenting a common plenum of the respective tower between said at least three fill structure sections of the respective tower for receiving generally horizontal currents of air simultaneously from all of said fill structure sections of a respective tower,
   each of said air outlet faces having opposed, vertically extending air regions,
   said fill structure sections being arranged at intervals around the perimeter of said plenum with each of said side regions of said air outlet faces being adjacent a side region of an adjacent fill structure section thereby defining the extent of said plenum;
   fan means operable to pull cool air in through the fill structure sections and communicating with said plenum to discharge hot air in an upward direction out of said tower;
   each of said towers including air baffle corner supports extending from said cold water collection basin means to said hot water distribution means for supporting said distribution means over said fill structure sections, serving to carry said fill structure sections between adjacent pairs of said air baffle supports, and located to substantially block inflow of ambient air between adjacent fill sections; and
   said towers being arranged in adjacent, side-by-side relationship such that an air baffle corner support is disposed adjacent the air baffle corner support of a proximal tower to thereby facilitate the entry of air to reach of said fill structure sections of each tower,
   each of said towers has four fill structure sections arranged in a horizontally rectangular configuration, and said air baffle corner supports define L-shaped walls located in close proximal relationship to end portions of respective, adjacent fill structure sections to block inflow of cool air to a corresponding tower plenum in bypassing relationship to the fill structure sections thereof.

* * * * *